(12) United States Patent
Na

(10) Patent No.: US 12,517,795 B2
(45) Date of Patent: Jan. 6, 2026

(54) REPLACEMENT OF FAILED MEMORY UNIT WITH REDUNDANCY MEMORY UNIT IN A MEMORY DEVICE AND METHOD THEREOF

(71) Applicant: SK hynix Inc., Icheon-si (KR)

(72) Inventor: Hyeong Ju Na, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 20 days.

(21) Appl. No.: 18/605,679

(22) Filed: Mar. 14, 2024

(65) Prior Publication Data

US 2025/0156274 A1 May 15, 2025

(30) Foreign Application Priority Data

Nov. 9, 2023 (KR) .................. 10-2023-0154049

(51) Int. Cl.
- *G06F 11/16* (2006.01)
- *G06F 11/10* (2006.01)
- *G11C 29/00* (2006.01)

(52) U.S. Cl.
CPC ...... *G06F 11/1666* (2013.01); *G06F 11/1092* (2013.01); *G06F 11/1658* (2013.01); *G11C 29/702* (2013.01); *G11C 29/808* (2013.01); *G11C 29/838* (2013.01)

(58) Field of Classification Search
CPC ... G11C 29/44; G11C 29/4401; G11C 29/702; G11C 29/76; G11C 29/808; G11C 29/838; G11C 11/417; G11C 2029/0411; G06F 11/0793; G06F 11/1008; G06F 11/1048; G06F 11/106; G06F 11/1417; G06F 11/1666; G06F 11/2094; G06F 12/02
See application file for complete search history.

(56) References Cited

U.S. PATENT DOCUMENTS

| | | | |
|---|---|---|---|
| 9,349,491 B1 * | 5/2016 | Morgan | G11C 29/88 |
| 2020/0151070 A1 | 5/2020 | Lee et al. | |
| 2021/0165721 A1 * | 6/2021 | Blagodurov | G06F 11/106 |
| 2024/0330133 A1 * | 10/2024 | Shukla | G11C 29/76 |

FOREIGN PATENT DOCUMENTS

KR 10-2020-0019463 A 2/2020

* cited by examiner

*Primary Examiner* — Michael Maskulinski

(57) ABSTRACT

A memory device includes a volatile memory including M number of memory units and N number of redundancy memory units; and a volatile memory controller configured to transmit, to the volatile memory, a command requesting that a target memory unit in which a failure has occurred among the M number of memory units be replaced with a target redundancy memory unit among the N number of redundancy memory units.

10 Claims, 9 Drawing Sheets

REPLACEMENT OF FAILED MEMORY UNIT WITH REDUNDANCY MEMORY UNIT IN A MEMORY DEVICE AND METHOD THEREOF

CROSS-REFERENCE TO RELATED APPLICATION

The present application claims priority under 35 U.S.C. § 119(a) to Korean Patent Application No. 10-2023-0154049 filed in the Korean Intellectual Property Office on Nov. 9, 2023, which is incorporated herein by reference in its entirety.

BACKGROUND

1. Technical Field

Various embodiments of the disclosed technology generally relate to a memory device in which a failed memory unit is replaced with a redundancy memory unit, and methods thereof.

2. Related Art

A volatile memory (e.g., an SRAM or a DRAM) loses stored data when power supply is cut off, and a nonvolatile memory (e.g., a NAND flash, a PRAM or an MRAM) retains stored data even when power supply is cut off.

A failure may occur in a memory unit included in the volatile memory during the process of manufacturing the volatile memory or during the course of using the volatile memory. When a failure occurs, the volatile memory needs to replace a failed memory unit with another memory unit.

SUMMARY

Various embodiments of the disclosed technology are directed to providing a memory device that can more quickly and efficiently replace a failed memory unit, and a method thereof.

In an aspect, a memory device may include: i) a volatile memory including an M (where M is a natural number of 2 or greater) number of memory units and an N (where N is a natural number of 2 or greater) number of redundancy memory units; and ii) a volatile memory controller configured to transmit to the volatile memory, when a target memory unit from among the M number of memory units has failed, a command requesting replacement of the target memory unit with a target redundancy memory unit from among the N number of redundancy memory units.

In another aspect, a method for operating a memory device may include: i) determining a target memory unit that has failed from is among an M (M is a natural number of 2 or greater) number of memory units; ii) generating a command that requests replacement of the target memory unit with a target redundancy memory unit from among an N (where N is a natural number of 2 or greater) number of redundancy memory units; and iii) transmitting the command to a volatile memory that includes the M number of memory units and the N number of redundancy memory units.

In still another aspect, a memory device may include: i) a volatile memory including an M (M is a natural number of 2 or greater) number of memory units and an N (N is a natural number of 2 or greater) number of redundancy memory units; and ii) a volatile memory controller including a nonvolatile memory that stores mapping information that includes mapping of a failed target memory unit from among the M number of memory units to a replacement target redundancy memory unit from among the N number of redundancy memory units. The volatile memory controller may read, upon power-on, the mapping information stored in the nonvolatile memory, and may transmit the mapping information to the volatile memory. The volatile memory may include a mapping unit that stores the received from the volatile memory controller after power-on.

According to the embodiments of the disclosed technology, a failed memory unit may be more quickly and efficiently replaced.

DETAILED DESCRIPTION

Figure 1:
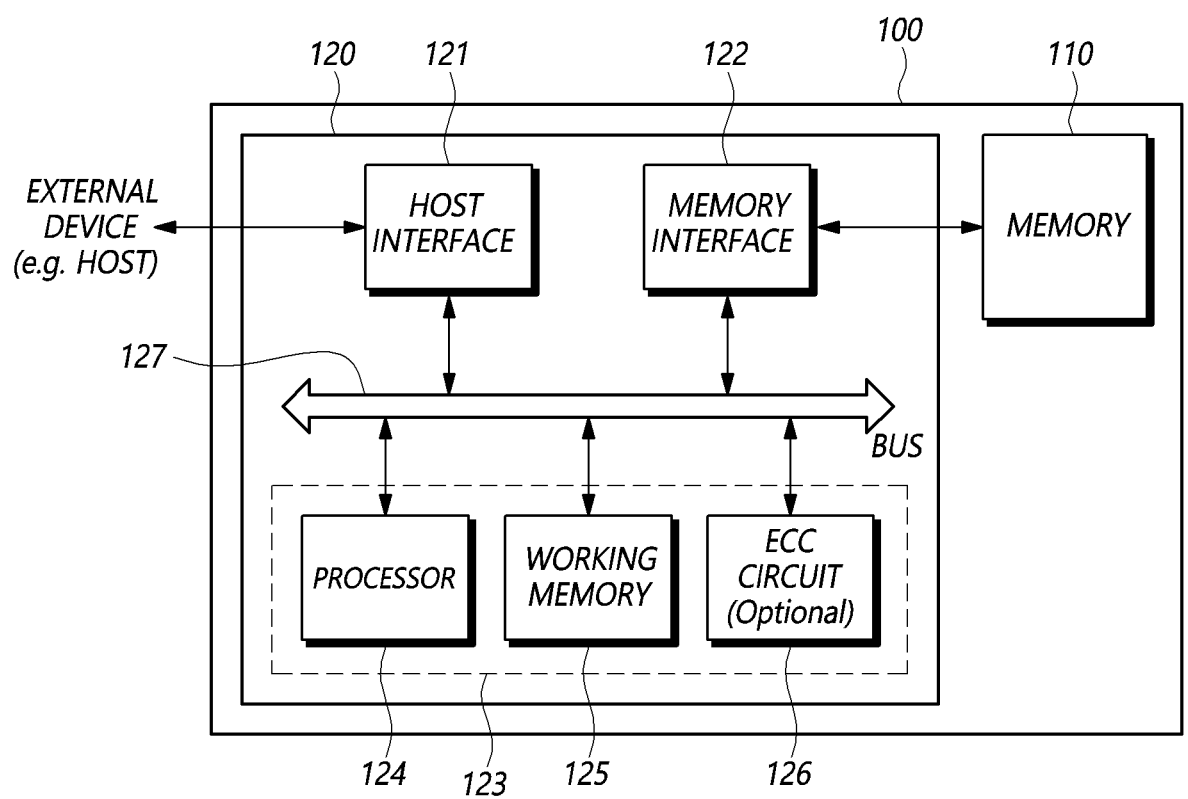
FIG. 1 is a schematic configuration diagram of a storage device according to an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device according to an embodiment of the disclosure.

Referring to FIG. 1, a storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the is memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency is identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device 100 to be capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various is interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer. The flash translation layer may receive the logical block address and translate the logical block address into the physical block address, by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer, which performs a translating function between a logical address requested to the storage device 100 from the host and a physical address of the memory 110; a host interface layer (HIL), which serves to analyze a command requested to the storage device 100 as a storage device from the host and transfer the command to the flash translation layer; and a flash interface layer (FIL), which transfers a command, instructed from the flash translation layer, to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM). Meanwhile, the controller 120 may additionally use a separate volatile memory (e.g., SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the 1o read unit of a flash memory. Sectors constituting each read data may be matched with one another using an address.

The error detection and correction circuit 126 may calculate a bit error rate (BER), and may determine whether an error is correctable or not, by sector units. For example, when a bit error rate is higher than a reference value, the error detection and correction circuit 126 may determine that a corresponding sector is uncorrectable or a failure. On the other hand, when a bit error rate is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector that is uncorrectable in read data last. There may be one or more sectors that are determined to be uncorrectable. The error detection and correction circuit 126 may transfer information (e.g., address information) regarding a sector that is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
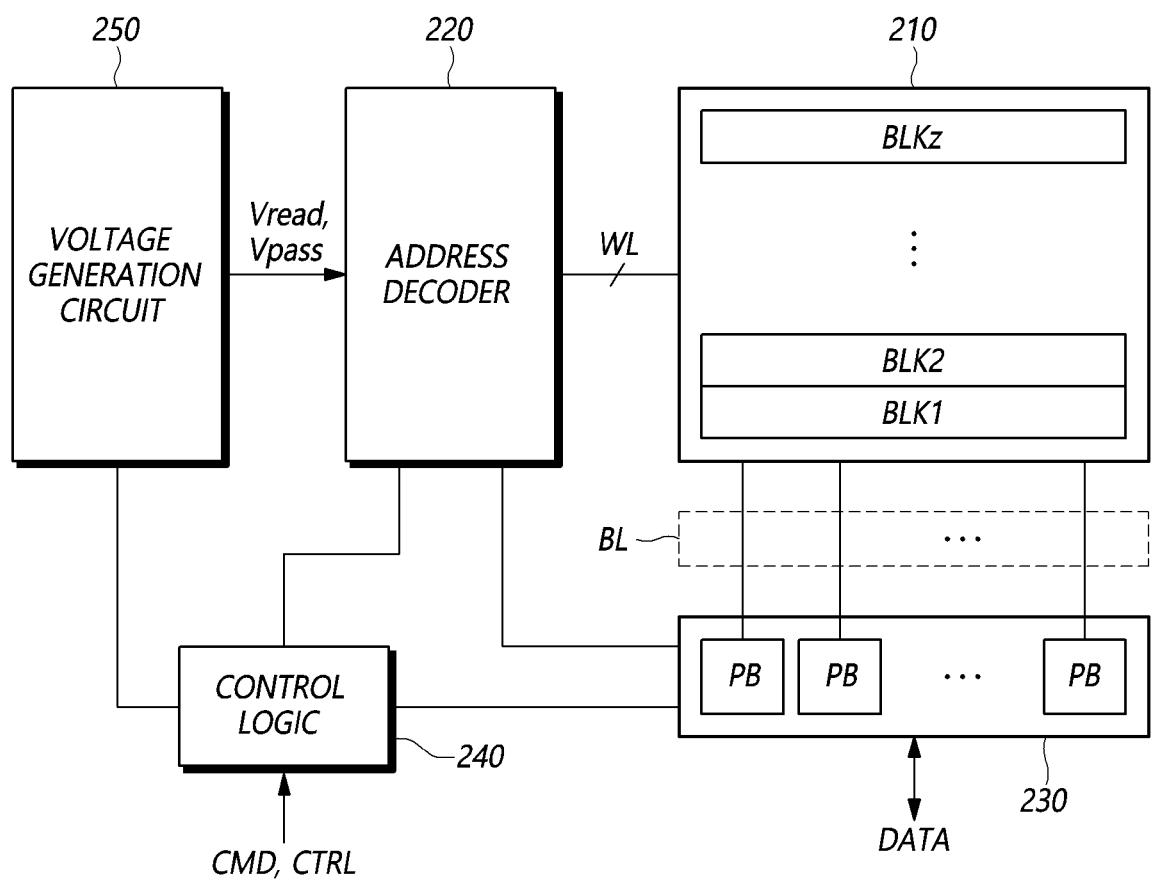
FIG. 2 is a block diagram schematically illustrating a memory of FIG. 1.

FIG. 2 is a block diagram schematically illustrating a memory of FIG. 1.

Referring to FIG. 2, a memory 110 may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source, and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
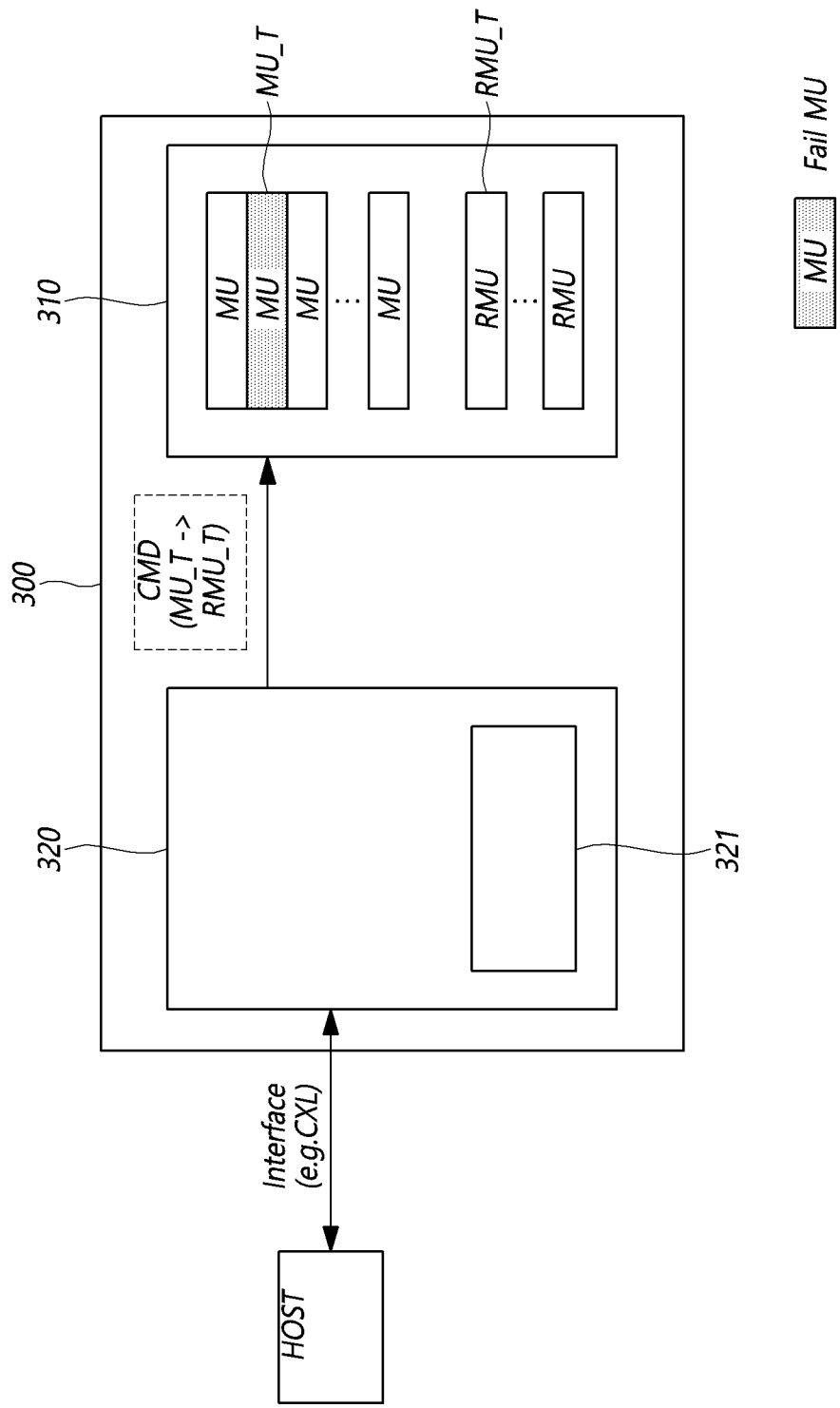
FIG. 3 is a diagram illustrating a memory device according to an embodiment of the disclosed technology.

FIG. 3 is a diagram illustrating a memory device according to an embodiment of the disclosed technology.

Referring to FIG. 3, a memory device 300 may include a volatile memory 310 and a volatile memory controller 320.

The volatile memory 310 may include an M (where M is a natural number of 2 or greater) number of memory units MU and an N (where N is a natural number of 2 or greater) number of redundancy memory units RMU. Each of the memory units MU and the redundancy is memory units RMU may include a plurality of memory cells and may store data.

Memory cells included in each of the memory units MU may be connected to one of an M number of word lines (not illustrated) that are included in the volatile memory 310. In addition, memory cells included in each of the redundancy memory units RMU may be connected to one of an N number of redundancy word lines (not illustrated) that are included in the volatile memory 310.

In order to access the memory units MU, the volatile memory controller 320 may transmit an access request (e.g., a read request or a write request) to the volatile memory 310 and may specify the address of a memory unit to access.

The volatile memory controller 320 cannot, however, directly access the redundancy memory units RMU. The redundancy memory units RMU are memory units that may be used to replace a failed memory unit when a failure occurs in memory units MU.

The volatile memory controller 320 may transmit, to the volatile memory 310, a command CMD requesting replacement, from among the M number of memory units MU, a target memory unit MU_T, in which a failure has occurred. The target memory unit MU_T may be replaced with a target redundancy memory unit RMU_T included among the N number of redundancy memory units RMU.

The volatile memory controller 320 may include an arithmetic unit (not illustrated), which executes instructions for transmitting the is command CMD to the volatile memory 310. The volatile memory controller 320 may include a nonvolatile memory 321, which may store data necessary to control the volatile memory 310.

The volatile memory controller 320 may communicate with a host through a preset interface (e.g., an CXL (Compute Express Link) interface). After receiving a request from the host through the interface, the volatile memory controller 320 may generate the command CMD and transmit the command CMD to the volatile memory 310. The response of the volatile memory 310 to the command CMD may be transmitted by the volatile memory controller 320 through the interface to the host.

The volatile memory 310 may receive the command CMD and replace the target memory unit MU_T with the target redundancy memory unit RMU_T. The volatile memory 310 may access the replaced target redundancy memory unit RMU_T instead of the target memory unit MU_T when the volatile memory controller 320 transmits an access request for the target memory unit MU_T to the volatile memory 310.

In other instances, the volatile memory 310 may directly determine the failure of the target memory unit MU_T during runtime, without a request from the volatile memory controller 320. In order to replace the target memory unit MU_T with the target redundancy memory unit RMU_T, the volatile memory 310 may take a longer period of time to search for the target redundancy memory unit RMU_T and to is map the target memory unit MU_T and the target redundancy memory unit RMU_T through an operation such as electrical fuse-setting.

In contrast, when the volatile memory controller 320 replaces the target memory unit MU_T with the target redundancy memory unit RMU_T by sending a command CMD to the volatile memory 310, it is possible to more quickly and efficiently replace a failed target memory unit MU_T with a target redundancy memory unit RMU_T.

The target memory unit MU_T in which a failure has occurred may be determined in various ways.

For example, a target memory unit MU_T may be a memory unit in which the number of error bits occurred during access exceeds a threshold value.

In another example, the target memory unit MU_T may be a memory unit in which the number of times errors have occurred during a predetermined time period exceeds a threshold value.

In still another example, the target memory unit MU_T may be a memory unit in which the number of accesses have been made during a predetermined time period exceeds a threshold value.

The memory device 300, the volatile memory 310 and the volatile memory controller 320 described above may be implemented in various ways.

For example, the memory device 300 may be a storage device 100 described above with reference to FIG. 1. The volatile memory controller 320 may be implemented by a controller 120 described above with reference to FIG. 1, and the volatile memory 310 may be a working memory 125 described above with reference to FIG. 1 or a random access memory that is separately added to the storage device 100. The nonvolatile memory 321 included in the volatile memory controller 320 may be a separate component that is different from the working memory 125 or the memory 110 described above with reference to FIG. 1.

In another example, the memory device 300 may be a CXL (Compute Express Link) memory. The volatile memory controller 320 may be implemented by a CXL controller, and the volatile memory 310 may be a random access memory that is included in the CXL memory.

In order for a volatile memory controller 320 to request that a volatile memory 310 replaces a target memory unit MU_T with a target redundancy memory unit RMU_T, the volatile memory controller 320 needs information regarding the N number of redundancy memory units RMU.

For example, information on the N number of redundancy memory units RMU may include the row addresses of the N number of redundancy memory units RMU.

In another example, information on the N number of redundancy memory units RMU may include the number of available redundancy memory units RMU and the size of each redundancy memory unit RMU.

The volatile memory controller 320 may acquire information is on the N number of redundancy memory units RMU in various ways.

For example, the volatile memory controller 320 may store predefined information, such as the N number of redundancy memory units RMU.

In another example, the volatile memory controller 320 may send a request for information, such as for example the N number of redundancy memory units RMU, to the volatile memory 310 during runtime. This will be described below in detail with reference to FIG. 4.

Figure 4:
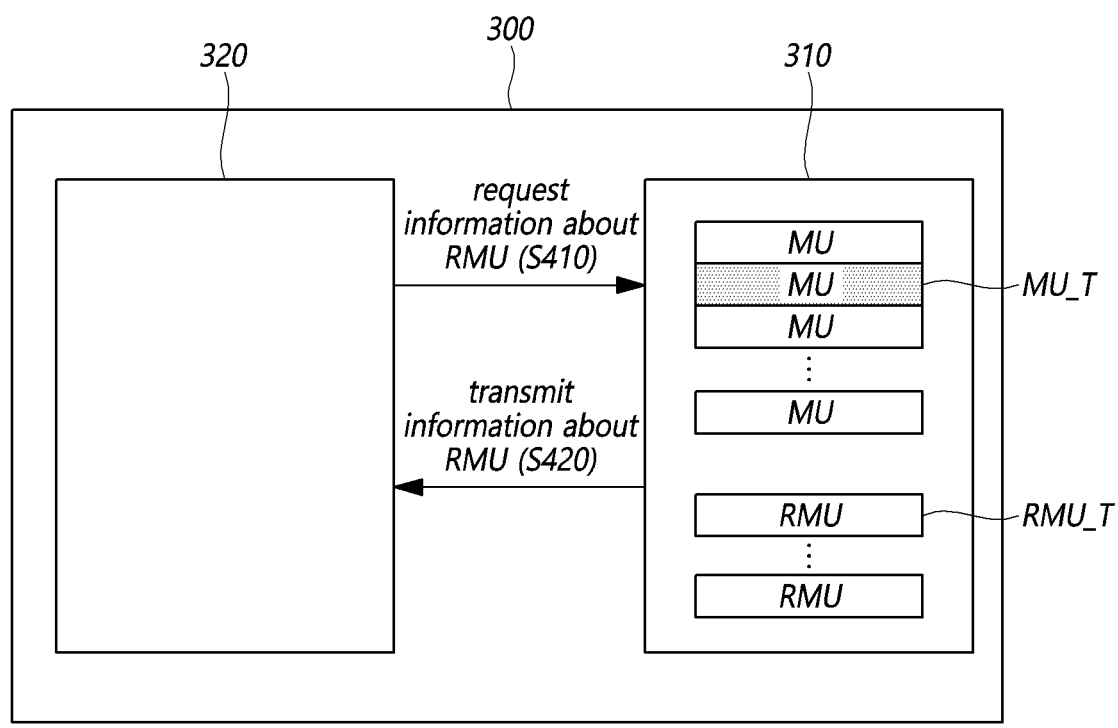
FIG. 4 is a diagram illustrating an operation in which a volatile memory controller requests information regarding redundancy memory units in a volatile memory according to an embodiment of the present disclosure.

FIG. 4 is a diagram illustrating an operation in which a volatile memory controller requests information regarding redundancy memory units in a volatile memory according to an embodiment of the present disclosure.

Referring to FIG. 4, a volatile memory controller 320 may send a request for information, such as the N number of redundancy memory units RMU, to the volatile memory 310 (S410).

In response to the request transmitted in step S410, the volatile memory 310 may transmit information on the N number of redundancy memory units RMU to the volatile memory controller 320 (S420).

Figure 5:
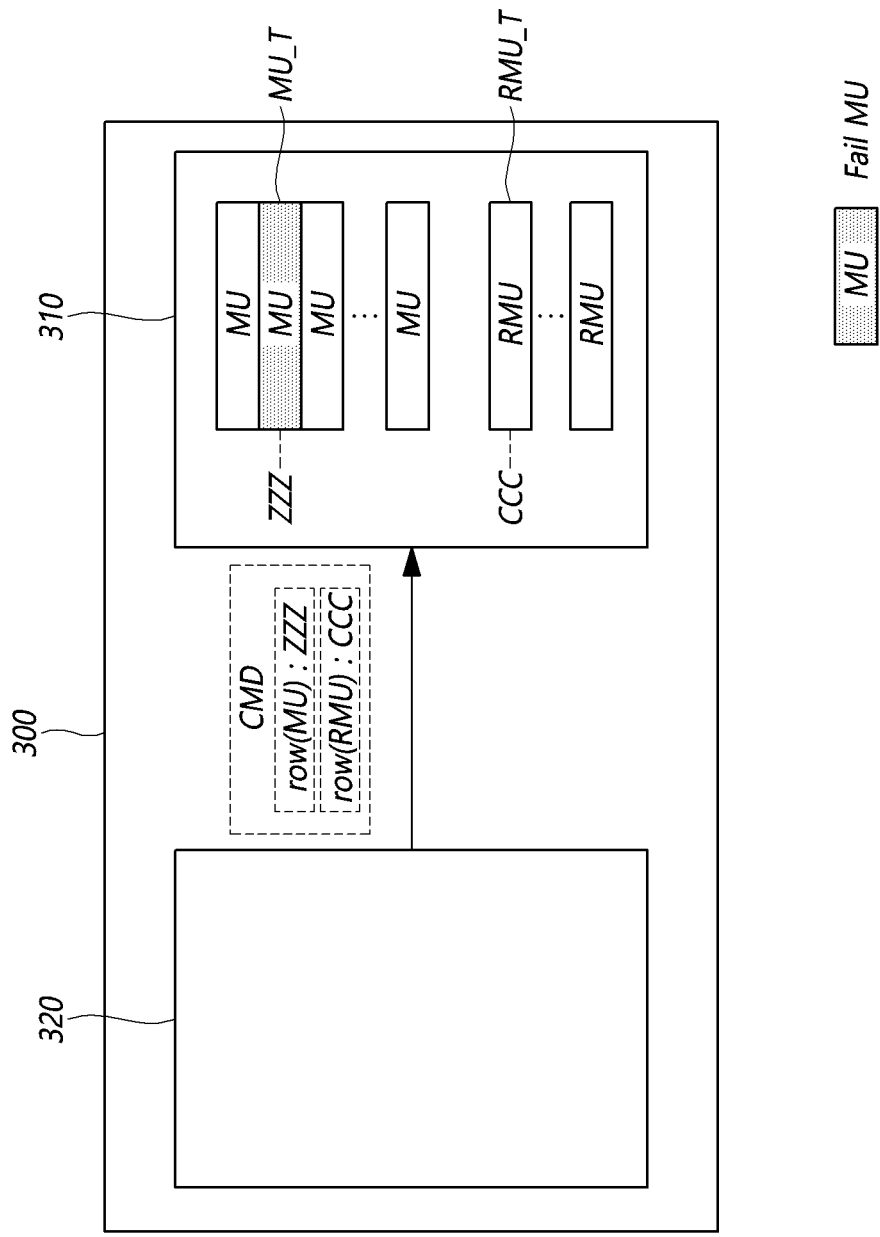
FIG. 5 is a diagram illustrating an operation in which a volatile memory controller transmits a command with an address to a volatile memory according to an embodiment of the present disclosure.

FIG. 5 is a diagram illustrating an operation in which a volatile memory controller transmits a command with an address to a volatile memory according to an embodiment of the present disclosure.

Referring to FIG. 5, in order to specify a target memory unit MU_T and a target redundancy memory unit RMU_T, a volatile memory is controller 320 may add a row address corresponding to the target memory unit MU_T and a row address corresponding to the target redundancy memory unit RMU_T to a command CMD. That is to say, the volatile memory controller 320 may expressly designate the target redundancy memory unit RMU_T that replaces the target memory unit MU_T.

In FIG. 5, a row address corresponding to a failed target memory unit MU_T is ZZZ, and the row address of the target redundancy memory unit RMU_T is CCC. The volatile memory controller 320 may add, to the command CMD, the row address ZZZ and the row address CCC in a request to the volatile memory 310 to replace the failed target memory unit MU_T with the target redundancy memory unit RMU_T.

For example, when a row address corresponding to the target memory unit MU_T is 3 and a row address corresponding to the target redundancy memory unit RMU_T is 1025, the volatile memory controller 320 may add the row address 3 and the row address 1025 to the command CMD.

Hereinbelow, an operation in which the volatile memory 310 processes the received command CMD will be described with reference to FIG. 6.

Figure 6:
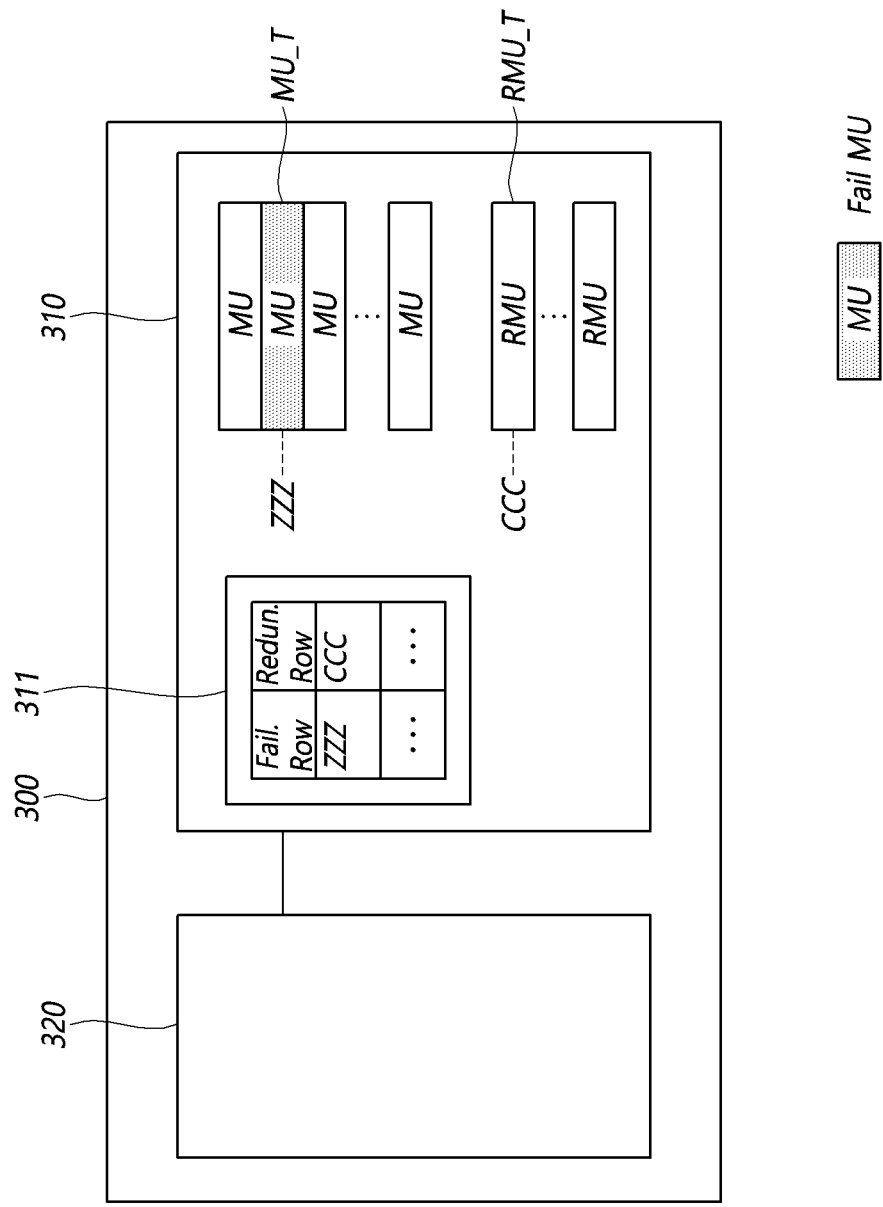
FIG. 6 is a diagram illustrating an operation in which a volatile memory stores mapping information in a mapping unit according to an embodiment of the present disclosure.

FIG. 6 is a diagram illustrating an operation in which a volatile memory stores mapping information in a mapping unit according to an embodiment of the present disclosure.

In FIG. 6, a volatile memory 310 may further include a mapping unit 311, which is able to store information that maps a relationship between a failed memory unit and a redundancy memory unit. The mapping unit 311 may be implemented by a latch, a register or the like.

FIG. 6 illustrates the mapping unit 311 included in the volatile memory 310 as an example. However, in other embodiments, the mapping unit 311 may be located outside of the volatile memory 310.

In response to a command CMD described above with reference to FIG. 5, the volatile memory 310 may store, in the mapping unit 311, mapping information such as a row address ZZZ corresponding to a target memory unit MU_T and a row address CCC corresponding to a target redundancy memory unit RMU_T.

Thereafter, referring to the mapping information stored in the mapping unit 311, the volatile memory 310 may process an access request for the target memory unit MU_T. In response to the access request corresponding to the target memory unit MU_T, the volatile memory 310 may access the target redundancy memory unit RMU_T.

For example, when processing a read request for data stored in the target memory unit MU_T, the volatile memory 310 may search for the row address ZZZ, which corresponds to the target memory unit MU_T, in the mapping unit 311 to locate the row address CCC mapped to the row address ZZZ. Using this mapping information, the volatile memory 310 may read data from the target redundancy memory unit RMU_T corresponding to the row address CCC, instead of from the target memory unit MU_T.

Figure 7:
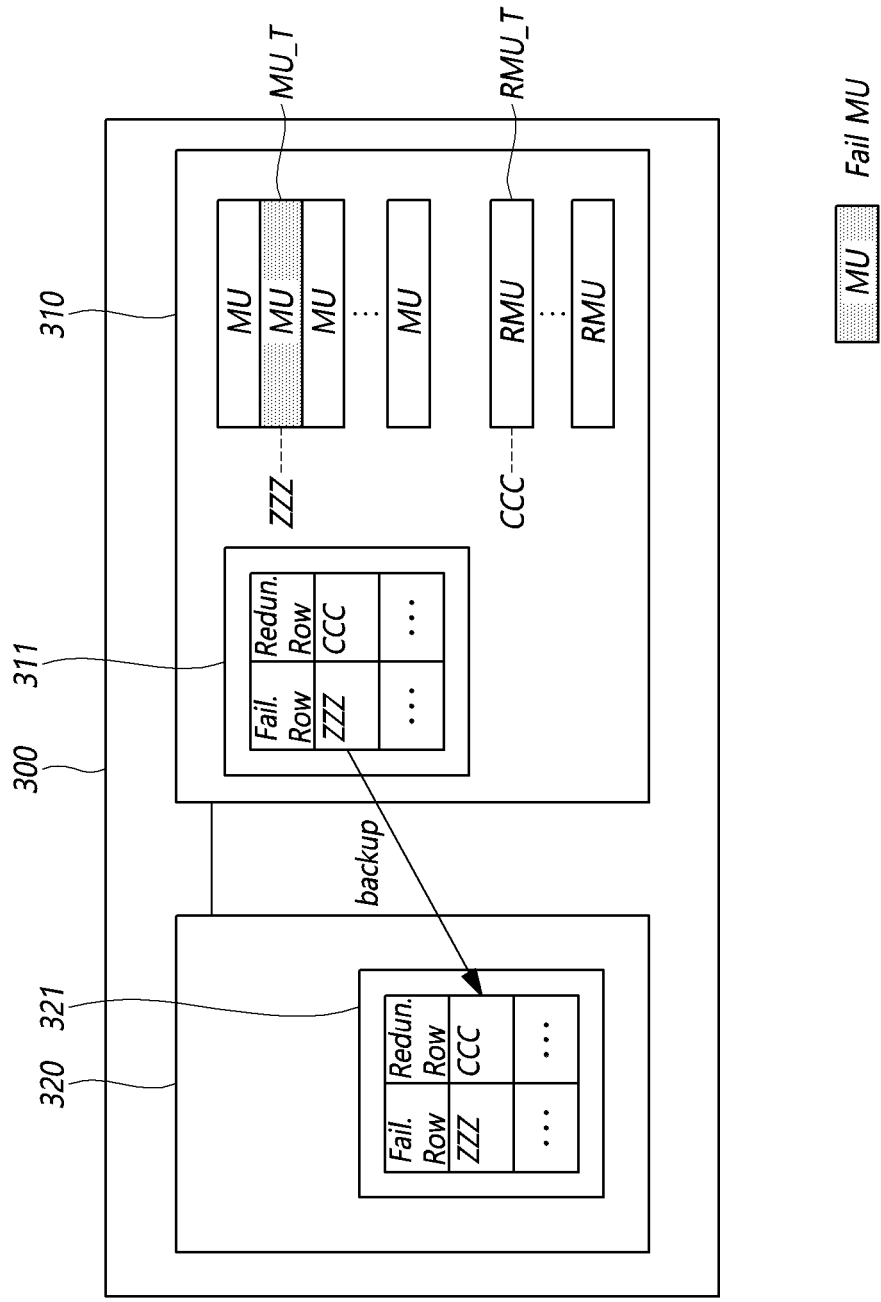
FIG. 7 is a diagram illustrating an operation in which a volatile memory controller backs up mapping information stored in a mapping unit according to an embodiment of the present disclosure.

FIG. 7 is a diagram illustrating an operation in which a volatile memory controller backs up mapping information stored in a mapping unit according to an embodiment of the present disclosure.

In FIG. 7, a volatile memory controller 320 may further include a nonvolatile memory 321.

The volatile memory controller 320 may back up mapping information stored in a mapping unit 311 to the nonvolatile memory 321.

For example, the volatile memory controller 320 may transmit a request to the volatile memory 310 for information stored in the mapping unit 311. The volatile memory controller 320 may receive, from the volatile memory 310, the information stored in the mapping unit 311 and may back up the received information to the nonvolatile memory 321.

In another example, the volatile memory controller 320 may directly access the mapping unit 311, and may back up the information stored in the mapping unit 311 to the nonvolatile memory 321.

In still another example, the volatile memory 310 may transmit the mapping information to the volatile memory controller 320 in response to a command CMD received from the volatile memory controller 320. The volatile memory controller 320 may back up the received mapping information to the nonvolatile memory 321.

The mapping information stored in the mapping unit 311 may be lost when power supply to the volatile memory 310 is cut off. Thus, in order to preserve the mapping information in a power-off state, the volatile memory controller 320 may back up the mapping information stored in the mapping unit 311 to the nonvolatile memory 321.

Hereinafter, an operation in which the volatile memory controller 320 recovers, upon power-on, the mapping information previously stored in the mapping unit 311 will be described.

Figure 8:
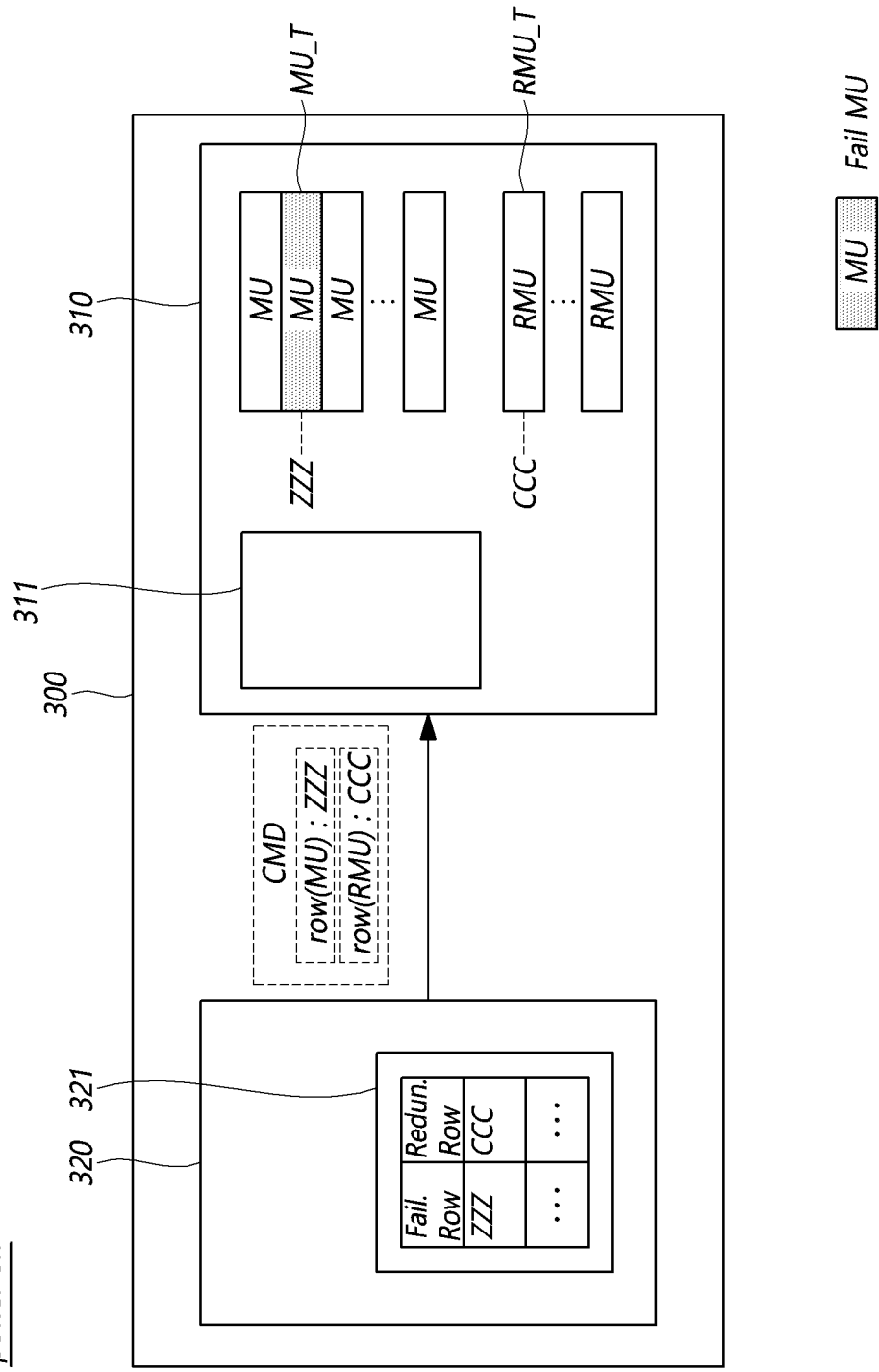
FIG. 8 is a diagram illustrating an operation in which a volatile memory controller retransmits a command upon power-on according to an embodiment of the present disclosure.

FIG. 8 is a diagram illustrating an operation in which a volatile memory controller 320 retransmits a command CMD upon power-on according to an embodiment of the present disclosure.

In FIG. 8, upon power-on, a volatile memory controller 320 accesses mapping information backed up in a nonvolatile memory 321. The volatile memory controller 320 may determine that a row address ZZZ corresponds to a target memory unit MU_T, that a row address CCC corresponds to a target redundancy memory unit RMU_T, and that these row addresses are mapped to each other.

The volatile memory controller 320 may then retransmit, to the volatile memory 310, a command CMD with mapping information including the row address ZZZ corresponding to the target memory unit MU_T and the row address CCC corresponding to the target redundancy memory unit RMU_T.

In a power-on state, the mapping information previously stored in the mapping unit 311 is lost. The volatile memory 310 may recover the mapping information using commands CMD retransmitted from the volatile memory controller 320.

Figure 9:
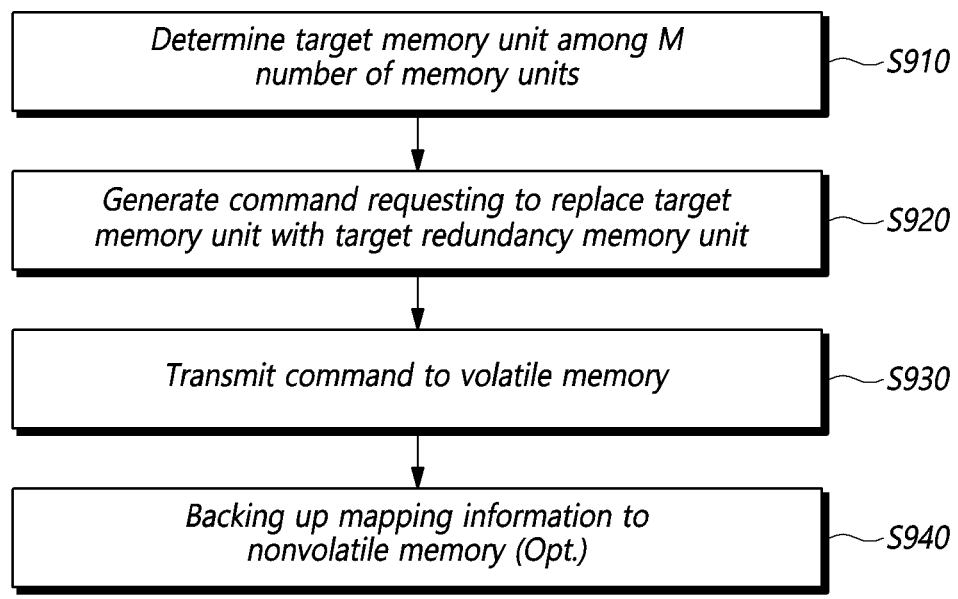
FIG. 9 is a diagram illustrating a method for operating a memory device based on an embodiment of the disclosed technology.

FIG. 9 is a diagram illustrating a method for operating a memory device 300 according to an embodiment of the present disclosure.

Referring to FIG. 9, a method for operating a memory device 300 may include step S910 of determining a target memory unit MU_T in which a failure has occurred from among an M number of memory units MU.

The method for operating the memory device 300 may include step S920 of generating a command CMD requesting replacement of the target memory unit MU_T determined in the step S910 with a target redundancy memory unit RMU_T from among an N number of redundancy memory units RMU.

For example, the step S920 may include step of adding, to the command CMD, a row address corresponding to the target memory unit MU_T and a row address corresponding to the target redundancy memory unit RMU_T.

The method for operating the memory device 300 may include step S930 of transmitting the command CMD generated in the step S920 to the volatile memory 310, in which the volatile memory 310 includes the M number of memory units MU and the N number of redundancy memory units RMU.

The method for operating the memory device 300 may further is include step of requesting information on the N number of redundancy memory units RMU to the volatile memory 310 and step of receiving the information on the N number of redundancy memory units RMU from the volatile memory 310 optionally.

The method for operating the memory device 300 may further include a step (not illustrated) of storing mapping information, including mapping between the row address corresponding to the target memory unit MU_T and the row address corresponding to the target redundancy memory unit RMU_T, in the mapping unit 311 included in the volatile memory 310 optionally.

The method for operating the memory device 300 may optionally include step S940 of backing up the mapping information stored in the mapping unit 311 to the nonvolatile memory 321.

The method for operating the memory device 300 may further include a step (not illustrated) of retransmitting, to the volatile memory 310 upon power-on, a command CMD that requests replacement of the target memory unit MU_T with the target redundancy memory unit RMU_T using mapping information backed up in the nonvolatile memory 321 optionally.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying is drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:
1. A memory device comprising:
a volatile memory including an M number of memory units and an N number of redundancy memory units; and
a volatile memory controller configured to transmit to the volatile memory, when a target memory unit from among the M number of memory units has failed, a command requesting replacement of the target memory unit with a target redundancy memory unit from among the N number of redundancy memory units, wherein each of M and N is a natural number of 2 or greater, wherein the volatile memory controller adds, to the command, a row address corresponding to the target memory unit and a row address corresponding to the target redundancy memory unit.

2. The memory device according to claim 1, wherein
the volatile memory controller requests information on the N number of redundancy memory units, and
the volatile memory controller receives the information on the N number of redundancy memory units from the volatile memory.

3. The memory device according to claim 1, wherein
the volatile memory further includes a mapping unit that stores mapping information including mapping between the target memory unit and the target redundancy memory unit, and
in response to the command, the volatile memory stores, in the mapping unit, the mapping information including a row address corresponding to the target memory unit and a row address corresponding to the target redundancy memory unit.

4. The memory device according to claim 3, wherein the volatile memory accesses the target redundancy memory unit in response to an access request corresponding to the target memory unit.

5. The memory device according to claim 3, wherein
the volatile memory controller includes a nonvolatile memory, and
the volatile memory controller backs up the mapping information stored in the mapping unit to the nonvolatile memory.

6. The memory device according to claim 5, wherein the volatile memory controller transmits, to the volatile memory upon power-on, a command that requests replacement of the target memory unit with the target redundancy memory unit using the mapping information backed up to the nonvolatile memory.

7. A memory device comprising:
a volatile memory including an M number of memory units and an N number of redundancy memory units; and
a volatile memory controller configured to transmit to the volatile memory, when a target memory unit from among the M number of memory units has failed, a command requesting replacement of the target memory unit with a target redundancy memory unit from among the N number of redundancy memory units,
wherein each of M and N is a natural number of 2 or greater,
wherein the volatile memory further includes a mapping unit that stores mapping information including mapping between the target memory unit and the target redundancy memory unit, and
in response to the command, the volatile memory stores, in the mapping unit, the mapping information including a row address corresponding to the target memory unit and a row address corresponding to the target redundancy memory unit,
wherein the volatile memory controller includes a nonvolatile memory, and
the volatile memory controller backs up the mapping information stored in the mapping unit to the nonvolatile memory,
wherein the volatile memory transmits the mapping information to the volatile memory controller in response to the command, and
the volatile memory controller backs up the mapping information received from the volatile memory to the nonvolatile memory.

8. A method for operating a memory device, comprising:
determining a target memory unit that has failed from among an M number of memory units;
generating a command that requests replacement of the target memory unit with a target redundancy memory unit from among an N number of redundancy memory units;
transmitting the command to a volatile memory that includes the M number of memory units and the N number of redundancy memory units;
storing, in a mapping unit included in the volatile memory, mapping information that maps a row address corresponding to the target memory unit and a row address corresponding to the target redundancy memory unit;
backing up the mapping information stored in the mapping unit to a nonvolatile memory; and
transmitting, to the volatile memory upon power-on, a command that requests replacement of the target memory unit with the target redundancy memory unit using the mapping information backed up to the nonvolatile memory,
wherein each of M and N is a natural number of 2 or greater.

9. The method according to claim 8, further comprising:
requesting information on the N number of redundancy memory units; and
receiving the information on the N number of redundancy memory units from the volatile memory.

10. The method according to claim 8, wherein the generating of the command comprises:
adding, to the command, a row address corresponding to the target memory unit and a row address corresponding to the target redundancy memory unit.

* * * * *